May 31, 1938.  Y. WATANABE  2,119,064
AUTOMATIC TELEGRAPH RECEIVING MACHINE
Filed Jan. 17, 1935   5 Sheets-Sheet 1
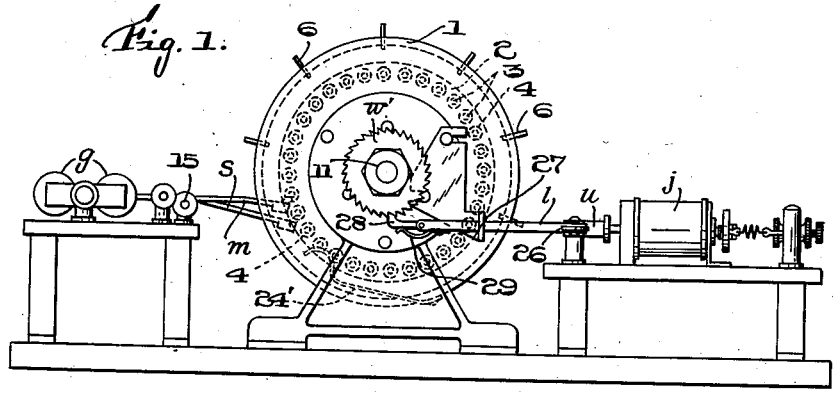
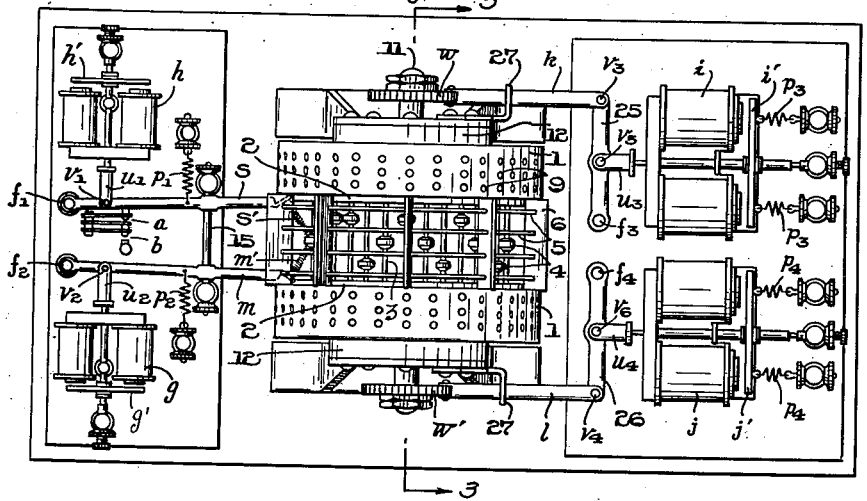
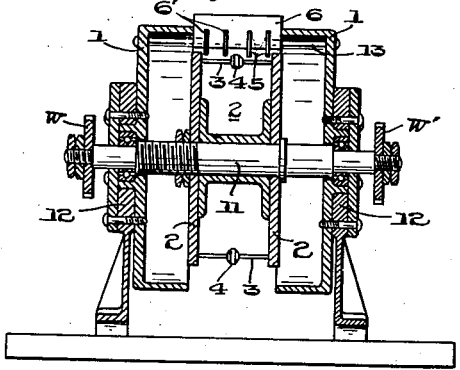
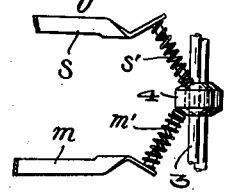
INVENTOR.
YOSHITO WATANABE
BY
ATTORNEYS.

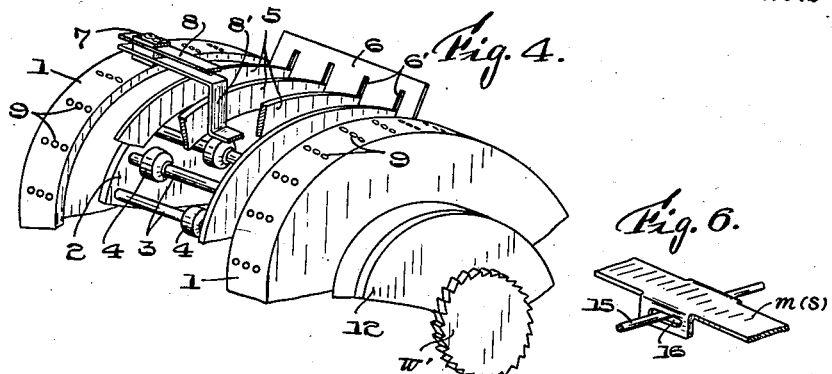
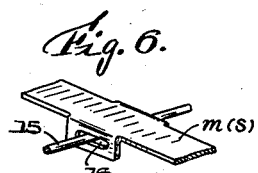
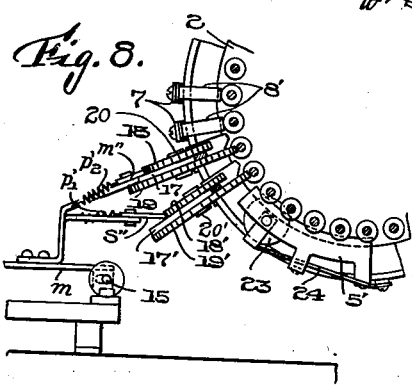
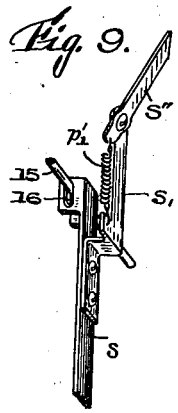
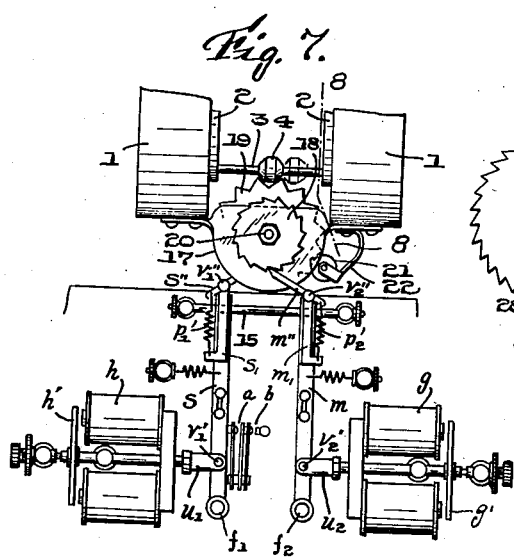
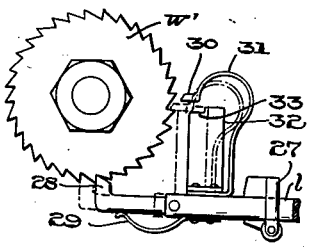

May 31, 1938.  Y. WATANABE  2,119,064
AUTOMATIC TELEGRAPH RECEIVING MACHINE
Filed Jan. 17, 1935  5 Sheets-Sheet 3

INVENTOR.
YOSHITO WATANABE
BY Richards & Geier
ATTORNEYS.

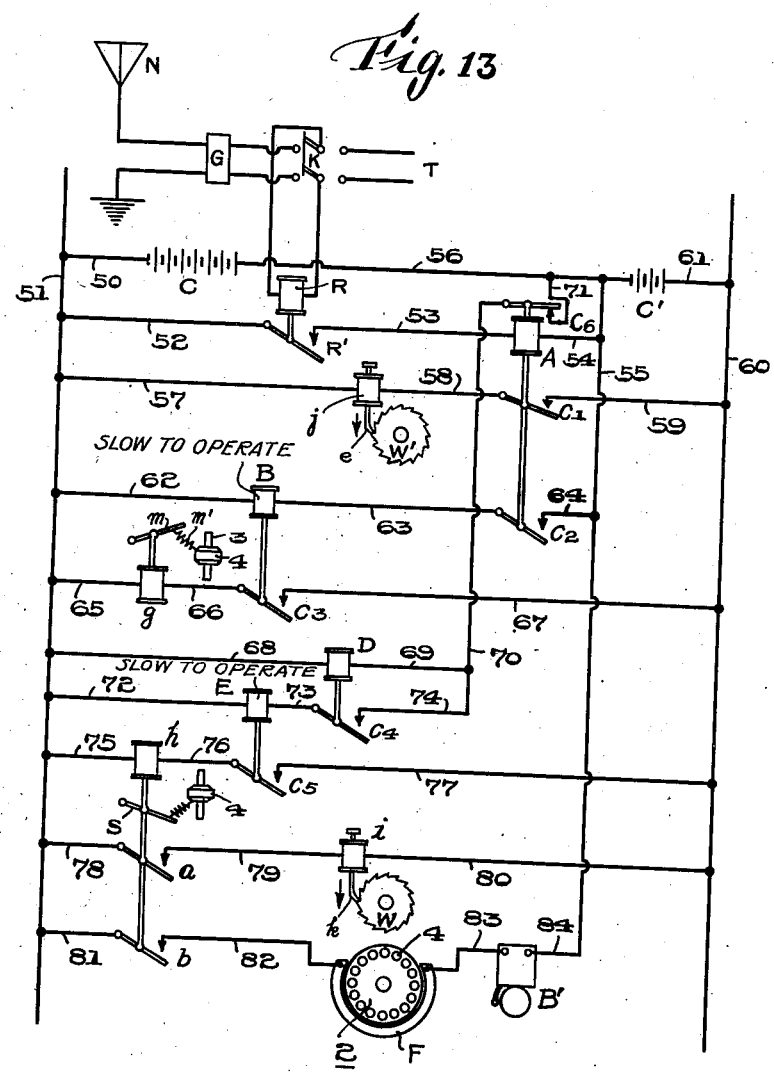

May 31, 1938.  Y. WATANABE  2,119,064
AUTOMATIC TELEGRAPH RECEIVING MACHINE
Filed Jan. 17, 1935  5 Sheets-Sheet 5
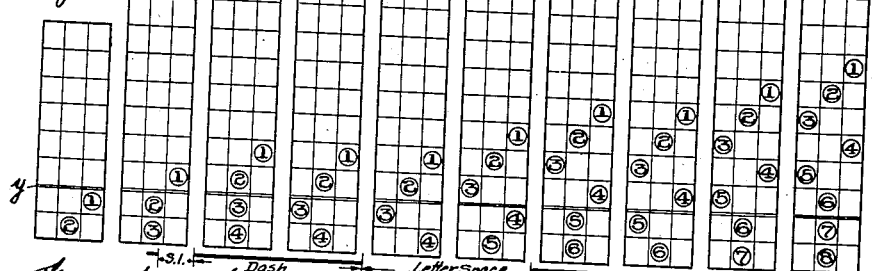
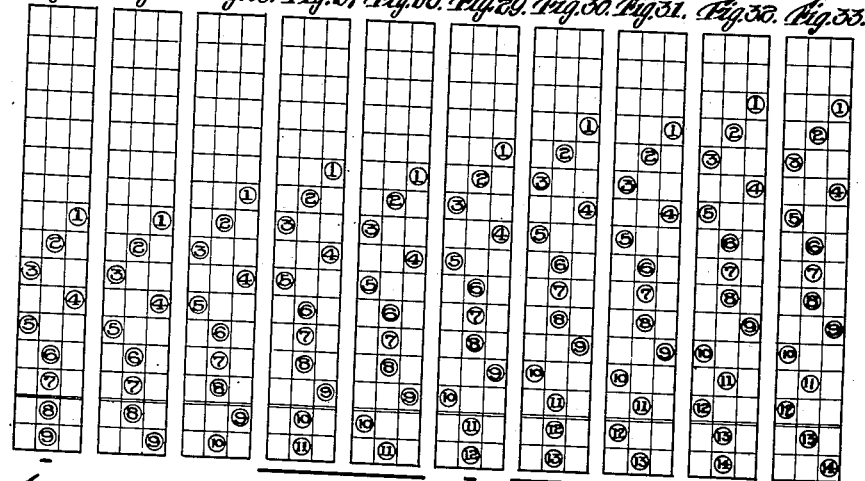
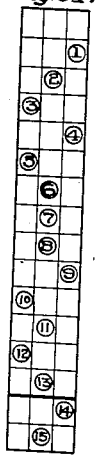
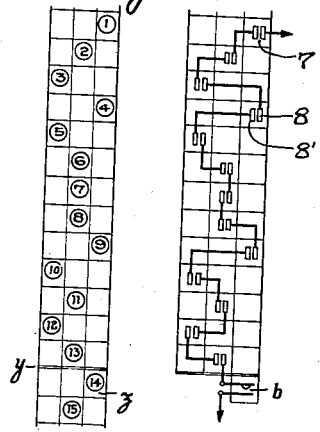
INVENTOR.
YOSHITO WATANABE
BY Richards & Geier
ATTORNEYS.

Patented May 31, 1938

2,119,064

UNITED STATES PATENT OFFICE 2,119,064

AUTOMATIC TELEGRAPH RECEIVING MACHINE

Yoshito Watanabe, Kinukake-cho, Suma-ku, Kobe, Japan

Application January 17, 1935, Serial No. 2,156
In Japan March 12, 1934

1 Claim. (Cl. 177—353)

The present invention relates to an automatic telegraph receiving machine, and particularly to the one which comprises a movable controller provided with a series of contact-making elements, the controller being movable one section at a time; a selective means moving said contact-making elements selectively in response to different electric signals according to any suitable telegraphic code and adapted to cause said selectively controlled contact-making elements to trace separate tracks when said movable controller travels; a group of contact members arranged in fixed manner and contacted by said controlled contact-making elements; and an alarming device operating upon the completion of the circuits of the predetermined series of contact members.

The object of this invention is to enable any expected signal, according to a certain telegraphic code, to be denoted automatically in a simple manner, and to save the trouble of keeping watch over a receiver.

In the wired telegraphic receiving system in use at present, if a signalling bell were omitted, the inconvenience would be very great. In the known wireless telegraphic art, utilizing electrical waves, there is no means corresponding to the aforementioned signalling bell used in wired telegraphy. It is, therefore, impossible to know when a signal has arrived unless a wireless telegraphic receiver is kept applied to one's ears all of the time. Accordingly, in transmitting a message, it is difficult to open conversation with the addressee unless he happens to have a receiver applied to his ear at the time of the transmission of said message.

The present invention discloses means to remove such drawback, whereby upon receipt of a call signal the present selector is automatically operated to ring a bell, thus eliminating the necessity of keeping watch over a receiver, as heretofore.

In order to effect the reading of Morse telegraph code very simply, in one embodiment of this invention a group of contact making elements such as rollers or any other suitable means is provided at a rotatable controller having mechanisms able to rotate one section forward successively in a certain direction, in such manner said group of rollers is removed to the right or left track at a right angle to the direction of the rotation of the rotatable controller in its cylindrical plane, but is not selected as regards signals corresponding to "dot" marks of the Morse code at selecting points and is allowed to stay in the neutral track or middle row. However, with regard to "dash" marks and "letter spaces" according to the Morse code, it is selected to the right and left and the rotatable controller is rotated one section forward, so that the rollers are arranged in order in three tracks, which are the right, middle and left tracks.

The invention is illustrated diagrammatically and by way of example in the accompanying drawings in which;

Fig. 1 is an elevation of an automatic telegraphic receiving machine according to the present invention;

Fig. 2, a plan view of the same;

Fig. 3, a sectional view along the line 3—3 of Fig. 2;

Fig. 4, a partial perspective view showing the relation between the rotatable body and a fixed frame of the drum type carrying a series of electric contacts;

Fig. 5, a front view showing a part of the selective means;

Fig. 6, a perspective view showing another part of the same means;

Fig. 7, a partial development showing another example of the above selective means;

Fig. 8, a partial side view along the line 8—8 of Fig. 7;

Fig. 9, a perspective view of a part of the selective means shown in Fig. 7;

Fig. 11 is a side view of a brake of a driving device;

Fig. 13 is an across-the-line wiring diagram;

Figs. 14 to 34 are a series of developments showing briefly the manner of transferring and selecting contact-making elements; and Fig. 35 is a series of developments showing a completed arrangement of a group of contact-making elements and an arrangement of a group of contact members corresponding to that of said contact elements, previously made.

Figure 10:
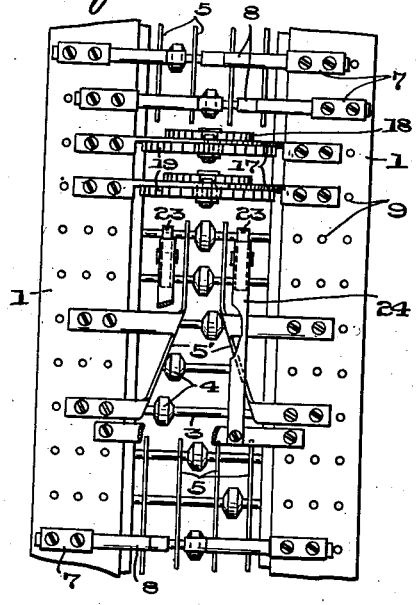
Fig. 10 is a developed front view of the essential parts of this machine.

As shown in Figs. 1 to 3, contact-making rollers 4 are fitted loosely onto the studs 3, which are uniformly arranged between opposite side plates 2 to form a squirrel cage with equal space between the studs. The side plates 2 have a rotatable shaft 11 fixed thereto to form a rotatable body. To the ends of the shaft 11 are fixed ratchet wheels W, W' having as many teeth as there are studs 3, and the shaft 11 of the rotatable body is borne upon a pair of bearings 12 constituted by a part of each fixed frame 1 of the drum type secured to the base of the machine at both sides of the rotatable body. The fixed frame 1 has holes 9 at its periphery to facilitate the attaching of a contact terminal 7 (see Fig. 4) at the position corresponding to each of said studs. A stationary and a flexible contact member 8 and 8', respectively, are connected to the contact terminal 7, said flexible movable contact 8' being adapted to be pressed, when brought into contact with the periphery of the contact-making roller 4 in the track, against the stationary contact 8 adapted to maintain a contact with the contact 8'.

Arc-shaped partitions 5 are used to secure the position of the rollers 4 on the studs 3. These partions are fitted tightly in the cuts 6' of any suitable holding plates 6 and are fixed to the fixed frame 1 together with the holding plates 6 by studs 13, as shown in Fig. 3, thus providing three tracks, namely, the right, middle, and left tracks. Said partitions 5, however, are not provided throughout the periphery of the rotatable body; they are not provided at several sections before the selecting points positioned at the entrance of the roller tracks. At such sections there are disposed roller aligning means comprising a pair of plates 5', which co-operatively provide an entrance substantially as wide as the total width of the said three-roller tracks, and which converge to a width substantially as wide as and in line with the middle track, as, for instance, shown in 5' of Fig. 10, so as to automatically transfer the rollers to the neutral track or middle row upon their engagement in said alignor.

The selective means, as for instance, shown in Figs. 2 and 5, consist of swing levers $s$, $m$ pivoted to the base of the machine at pivots $f_1$, $f_2$, respectively, and connected with springs $s'$, $m'$ (shown clearly in Fig. 5). The ends of push-rods $u_1$, $u_2$, which are fixed to the armatures $h'$ and $g'$ of electric magnets $h$ and $g$ are attached to the swing levers $s$ and $m$ at $v_1$ and $v_2$, so that when said electric magnet $h$ or $g$ operates, it attracts the armature $h'$ or $g'$ against the force of the spring $p_1$ or $p_2$ and moves the swing lever $s$ or $m$ around the pivots $f_1$ or $f_2$, thereby causing the spring $s'$ or $m'$ to push the roller 4 to the right or to the left along the stud 3.

But since it is undesirable to operate both the selecting levers $s$ and $m$ upon a roller of the same section, the lever $s$ is operated, for instance, upon a roller of the section following the rod $m$. The levers $s$, $m$ are provided with side apertures 16 to be fitted to transverse levers 15, as shown in Fig. 6, and are thus guided to make a horizontal movement. For example, in order that the selecting levers $s$ and $m$ may be brought into accurate engagement with the rollers 4, and that the adjacent studs may operate them, they must move precisely horizontally by the action of the magnets $g$ and $h$. With this object in view, they are partly bent at a right angle to their plane and are provided with side apertures 16, through which extends the transverse rod 15. In this way they are guided by the rod 15 to move horizontally, and thus the ends of the springs $m'$ are brought accurately into engagement with the adjacent rollers 4.

In Figs. 7, 8, and 10, which show another example of a pair of selective means, shafts 20, 20' have fastened thereon a pair of ratchets 18, 18', and a pair of toothed wheels 19, 19', respectively.

A pair of roller brakes are added to the mechanism, as shown in Figs. 2 and 5. Each set of toothed wheel and ratchet is fitted to supporting frames 17, 17' attached to the fixed frame 1, each of the toothed wheels 19, 19' being engaged with a roller 4 in the middle row, while the ratchet 18' or 18 is interlocked with the end of the pawl $s''$ or $m''$ pivoted at $v_1''$ or $v_2''$ to the end of a member $s_1$ or $m_1$ attached to the swing levers $s$ or $m$ having the pivots $f_1$ or $f_2$, while corresponding ends of the members $s_1$, $m_1$ are connected with the springs $p'_1$, $p'_2$, so that when the selective lever $s$ or $m$ is moved by the electric magnet $h$ or $g$, each of the ratchets 18', 18 is rotated to the extent of one tooth by the pawl $s''$ or $m''$ and, accordingly, the toothed wheel 19' or 19 is also rotated to be able to select with its teeth the roller 4 on the stud 3. It is needless to say that in each selective means the roller 4 is selected to the side opposite to that to which it is selected in the means shown in Figs. 2 and 5.

21 is the roller brake pivoted to the end of an elastic member 22 and fitted between the teeth of each wheel 19, 19' and is used for maintaining the position of these wheels securely.

The mechanisms for rotating the rotatable body forward have a pawl 28 (Fig. 11) or 28' with its base fitted to one end of a push-rod $k$ or $l$. The pawl is adapted to mesh with the teeth of a ratchet W or W', as shown in Fig. 2, while the other end of said push-rod is fitted to the end $v_3$ or $v_4$ of the swing lever 25 or 26 having pivots $f_3$, $f_4$. The swings levers 25, 26 are respectively connected at $v_5$, $v_6$ to the ends of push-rods $u_3$, $u_4$, which in turn are connected to the armatures $i'$, $j'$ of electric magnets $i$, $j$ drawn by springs $p_3$, $p_4$. The ratchet W or W' is rotated one section forward by the action of said electric magnets on electric impulse, as is evident to anyone skilled in the art. For the purpose of preventing the rotation of the rotatable body, more than one section by its inertia, as shown in Fig. 11, the push-rod $k$ or $l$ has secured thereto a member 32, which faces the ratchet W' and has a shoulder 33, and an elastic piece 31 having a wedge 30 at its end, so that when said rod $l$ operates and pushes the ratchet W' with the pawl 28, the wedge 30 is held between one of the teeth of the ratchet W' and the shoulder 33, as illustrated by a broken line in Fig. 11, and thus a brake is applied to the ratchet.

Also, for the purpose of holding the rotatable body accurately, a pair of brake wheels 23 (Fig. 8) is pivoted to the ends of elastic members 24 secured to the fixed frame 1 (Fig. 10) and is pressed between two studs 3 of the rotatable body; or the free end of the elastic piece 24' attached to the fixed frame 1 (Fig. 1) is so bent that it is held by the peripheries of two successive rollers at the roller-adjusting position.

Figure 12:
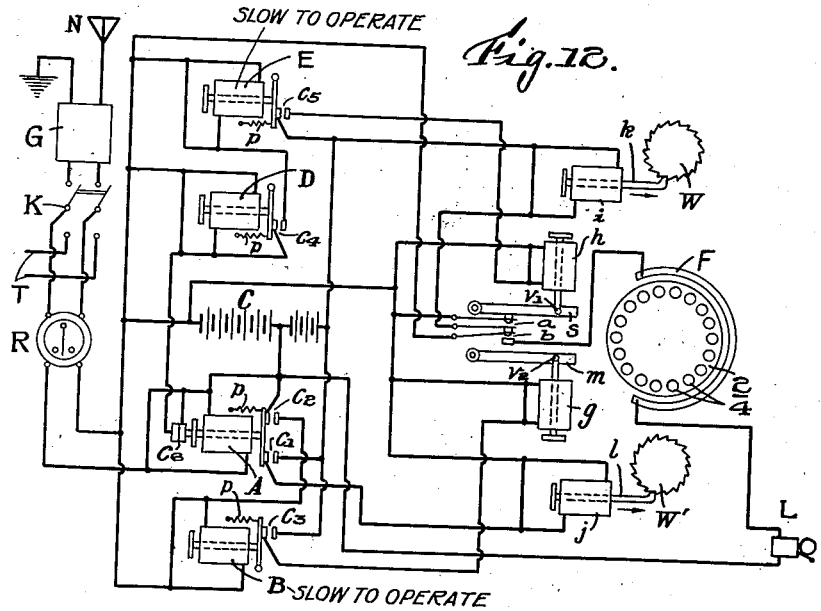
Fig. 12 is an electrical connection diagram showing an example of this automatic telegraph receiving system.

The electrical mechanisms for selecting the rollers and rotating the rotatable body forward are shown in Fig. 12 by way of an example, in which A, B, D, E, $h$, $g$, $i$, $j$ show electric magnets; K is a switch to change an aerial line N in radio for a wire telegraph line T; R, a preferably polarized relay; G, an amplifier and amplitude regulator; and C, an electric source. At L is connected an alarming device; $p$, are controlling springs of the armatures of the magnets A, B, D and E; F is a schematic view of an arrangement of a series of contacts at the fixed frame 1. Now, when the change over switch K is closed to the antenna side N and any electric signalling wave is received in the aerial N, the polarized relay R is operated to complete the circuit of the magnet A to be energized by the source C. The sum of the operating time of the contact point $c_2$ and the contact point $c_3$ of an electric magnet B is set to be long as compared with the lasting time of a "dot" mark, so that the contact point $c_1$ is closed only by the "dot" mark and at the same time an electric magnet $j$ is operated to push and move the ratchet W' with the rod $l$ and consequently rotate the rotatable body 2 one section forward.

Now the electric circuit in the across-the-line-wiring diagram shown in Fig. 13 will be traced when the switch K is closed on the antenna side N to receive the signal letters A, B and C according to the Morse code. The sign "A" consists of "one dot" and "one dash", namely, "· —", so that if the relay R is excited by the first "dot" mark and closes its contact R', it will complete a circuit consisting of the battery C, the lines 50, 51, 52, the contact R', the line 53, the magnetic coil A, and the lines 54, 55, 56, to close the contact $c_1$ of the magnet A and open the contact $c_6$. Since the contact $c_2$ is a slow acting contact, as stated above, it is not closed in case of a "dot" mark. Thus, the electric magnet $j$ is operated by a complete circuit consisting of the battery C, the lines 50, 51, 57, the electric magnet $j$, the line 58, the contact $c_1$, the lines 59, 60, 61, the battery C', and the line 56, causing the ratchet W' to turn and to move forward the rotatable body 2 by one step and accordingly moving the first and second rollers Nos. 1 and 2 to the position shown in Fig. 15, while maintaining the form shown in Fig. 14. When the said "dot" mark is terminated, the relay contact R' opens to open the contact $c_1$ and to close $c_6$ again. Next, if a "dash" mark arrives after the regular space time and closes the contact R', it will excite the electric magnet A again, and since its exciting time interval is long as compared with the "dot" mark, it closes the contact $c_1$ and opens $c_6$, at the same time also closing the contact $c_2$ and consequently moving forward the body 2 by the operation of the magnet $j$ as explained before (Fig. 16). A complete circuit is now provided which consists of the battery C, the lines 50, 51, 62, the electric magnet B, the line 63, the contact $c_2$ and the lines 64, 55, 56. The electric magnet B is operated by this circuit to close its contact $c_3$, whereupon the circuit consisting of the battery C, the lines 50, 51, 65, the electric magnet $g$, the line 66, the contact $c_3$, the lines 67, 60, 61, the battery C', and the line 56 is completed to operate the magnet $g$ and transfer the roller No. 3 by shifting the rod $m$ to the left track corresponding to the "dash" mark, as shown in Fig. 17.

When this "dash" mark is terminated and there is a regular letter space after it, the electric magnet A is reset to close the contact $c_6$, which will complete the circuit consisting of the battery C, the lines 50, 51, 68, the electric magnet D, the lines 69, 70, the closed contact $c_6$, and the lines 71, 56 to close the contact $c_4$ of the electric magnet D. Since the regular letter space occupies a comparatively long time, the electric magnet D is also excited for a comparatively long time, and accordingly the electric magnet E is operated by a complete circuit consisting of the battery C, the lines 50, 51, 72, the electric magnet E, the line 73, the closed contact $c_4$, the lines 74, 70, the reset contact $c_6$, and the lines 71, 56 to close its contact $c_5$. Then, by the complete circuit consisting of the battery C, the lines 50, 51, 75, the coil of $h$, the line 76, the closed contact $c_5$, the lines 77, 60, 61, the battery $C_1$, and the line 56, the electric magnet $h$ is excited to operate the rod $s$ and select the fourth roller No. 4 to the right as indicated in Fig. 18. At the same time, the electric magnet $h$ closes the contact $a$, so that the electric magnet $i$ is operated by a complete circuit consisting of the battery $C_1$ the lines 50, 51, 78, the closed contact $a$, the line 79, the coil of $i$, the lines 80, 60, 61, the battery C', and the line 56, the ratchet W being moved forward one step by the rod $k$, thereby moving forward the rotatable body 2 also to the extent of one step, as shown in Fig. 19. When the electric magnet $h$ is operated, the contact $b$ is also closed, but as in F, which is connected therewith, a series of contacts 7 is previously so arranged as to receive the signal letters "A B C", the circuit is not yet completed by the letter "A" alone, in consequence of which the alarm bell B' is not operated.

Next, upon arrival of the signal letter "B", namely "— · · ·", the circuits for the dash and dot marks as explained before are completed in succession. In the "dash" mark, firstly the fifth roller No. 5 is moved forward by one step from the position shown in Fig. 19 to that shown in Fig. 20; it stays in the middle row and then is selected to the left row, as illustrated in Fig. 21. Next, due to the three "dot" marks, the rollers advance gradually to the positions shown in Figs. 22, 23, and 24, and by the following "letter space" the ninth roller No. 9 is transferred to the right and is also moved forward by one step, as indicated in Figs. 25 and 26.

With regard to the next sign "C" or "— · — ·", the operations are carried out in the same manner as above, each operation of successive steps responding to each signal of "dash", "dot", "dash" and "dot", as illustrated in Figs. 27 to 32. Finally, in accordance with the next "letter space" the fourteenth roller No. 14 is transferred to the right row, as shown in Fig. 33, and advances one step, as shown in Fig. 34. Consequently, the series of rollers in the arrangement F is brought into coincidence with the arrangement of the contact group 7 previously connected as shown in Fig. 35, thus actuating the bell B' by a completed circuit consisting of the battery C, the lines 50, 51, 81, the closed contact $b$, the line 82, the arrangement F, the line 83 the bell B', and the lines 84, 55, 56.

Consequently, upon the arrival of an electric signal corresponding to a "dash" mark, the ratchet W' is turned on account of the first closing of the contact $c_1$ of the magnet A, and by the consequent completion of the contact $c_2$ the circuit of the electric magnet B is completed to close its contact $c_3$ by means of which electric current is passed to an electric magnet $g$ to operate the selecting rod $m$ and thus select the roller 4 to one side. Another contact $c_6$ of the electric magnet A is always closed, only opening when electric current is passed to that magnet, and the time required for operating the contact $c_5$ of the electric magnet E (in the circuit of which is comprised the contact $c_4$ of the electric magnet D after the close of the contact point $c_6$ of the magnet A) is set to be long as compared with the short time interval between signalling marks, such as two "dot" marks or "dot" and "dash" marks in one letter, so that when the electric magnet A once resets to close a contact point $c_6$ and then immediately operates to open it again, the contact $c_5$ of the magnet E is not closed if its lasting time is a short time interval between signalling marks. The contact $c_5$ is closed only with regard to a long time interval between signalling letter marks or so called "letter space" and passes electric current to the electric magnet $h$ for a selecting purpose and thus pushes the lever $s$, thereby permitting the selection of the roller 4 in the opposite direction, said lever $s$ having a contact $a$ and $f$ closed by its operation. By the completion of the contact an electric current is passed to the electric magnet $i$ whereby a push rod $k$ is operated to push the ratchet W and thus rotate the rotatable body 2 one section forward.

The fixed frame 1 of drum type has a series of terminals 7 each connected to a pair of movable and stationary contacts 8' and 8 secured to the before-mentioned holes 9 at its periphery, said contact terminals being previously connected in series and the end of moving contact piece 8' being arranged as shown on the right side of Fig. 35 in the same way as the above group of contact making rollers. If a series of contact terminals is connected with any suitable alarming device in series, the alarming circuit will be completed when this machine receives the predetermined signal such as a call signal "A B C" and the arrangement of controlled contact making rollers agrees with that of the set of contacts mounted upon the fixed frame.

If in this system after receiving the call signal "A B C" there is no signal following the letter "C" (this after all corresponds to a long letter space), the relays D and E are operated to actuate the relay $h$, when the last roller No. 14 is transferred to the "letter space track" through the ratchet wheel 18' by the lever S and, accordingly, by wheel 19' and the controller 2 is moved one step forward by the relay $i$ and stops. Therefore, although the last controlled roller No. 14 is situated directly before the entrance line $y$ of the track, it is impossible to provide there the contact fingers 8, 8' to be controlled by the roller No. 14, because of the presence of the selective wheel 19, as shown in Figs. 8 and 10. For this reason, as substitutes for the said contact fingers 8 and 8', there are provided the contacts $a$ and $b$, in which the contact $a$ is connected to the coil of the relay $i$, while the contact $b$ is connected in series with the contact group 7 arranged on the fixed frame 1 for the purpose of receiving the predetermined signal, namely "A B C", so that by its closing the alarming device may be operated. Therefore, the position of a contact point corresponding to the contact point as shown Fig. 35 is transferred to $b$ of Fig. 12 so as to be able to be closed by the operation of the rod $s$. Simultaneously with the completion of the contact points by all rollers except a roller in the last position $z$, said contact point $b$ can be closed by the rod $s$, so no difference is made to the operation.

Let it be understood that this invention may be modified in various ways without departing from its spirit.

I claim:

A selector device for closing a circuit in response to a prearranged code of dot, dash and interletter space impulses comprising a stationary frame, a rotatable squirrel-cage type controller mounted for rotation in said frame and having a plurality of studs fixed thereto, said studs being equally spaced at the periphery of said controller and each having a contact controller mounted thereon slidable longitudinally thereof, partitions fixed to said frame adjacent to the path of movement of said studs forming three passageways corresponding to dots, dashes and interletter spaces having entrances for said rollers, means for normally causing the rollers to be positioned to enter the dot passageway, selecting means positioned at the entrance to the passageways for moving the positioned roller to cause the roller to enter either the dash or interletter space passageway, means responsive to receipt of a dot dash or interletter space impulse to move the controller the space from one stud to the next to successively present the rollers to said selecting means, means responsive to the receipt of a dash impulse to cause the selecting means to move the then presented roller into the dash position, means responsive to the receipt of an interletter space impulse for causing the selecting means to move the then presented roller to interletter position, a plurality of contacts mounted on said frame to be engaged by said rollers, said contacts being each arranged with respect to the three positions capable of being assumed by the rollers in accordance with the code to which the selector is to respond and a circuit including in series all of said contacts.

YOSHITO WATANABE.